(12) United States Patent
Lafont et al.

(10) Patent No.: US 7,448,573 B2
(45) Date of Patent: Nov. 11, 2008

(54) ENGINE SUSPENSION PYLON FOR AIRCRAFT

(75) Inventors: Laurent Lafont, Pechbusque (FR);
Frederic Journade, Toulouse (FR);
Christophe Labarthe, Buzet Sur Tarn (FR)

(73) Assignee: Airbus France, Toulouse (FR)

( * ) Notice: Subject to any disclaimer, the term of this patent is extended or adjusted under 35 U.S.C. 154(b) by 236 days.

(21) Appl. No.: 11/525,025

(22) Filed: Sep. 22, 2006

(65) Prior Publication Data
US 2007/0069068 A1  Mar. 29, 2007

(30) Foreign Application Priority Data
Sep. 26, 2005 (FR) .................................. 05 52867

(51) Int. Cl.
*B64D 29/00* (2006.01)
(52) U.S. Cl. ......................................... 244/54; 248/554
(58) Field of Classification Search .................. 244/55, 244/54; 248/555, 554
See application file for complete search history.

(56) References Cited

U.S. PATENT DOCUMENTS

| | | | |
|---|---|---|---|
| 4,013,246 A | 3/1977 | Nightingale | |
| 4,132,069 A | 1/1979 | Adamson et al. | |

2007/0069068 A1  3/2007  Lafont et al.

FOREIGN PATENT DOCUMENTS

| EP | 0 583 158 A1 | 2/1994 |
|---|---|---|
| EP | 0 805 108 A2 | 11/1997 |
| EP | 1 053 937 A1 | 11/2000 |
| EP | 1 574 429 A2 | 9/2005 |

OTHER PUBLICATIONS

U.S. Appl. No. 12/067,192, filed Mar. 18, 2008, Lafont et al.
U.S. Appl. No. 12/066,916, filed Mar. 14, 2008, Lafont.

*Primary Examiner*—Timothy D Collins
(74) *Attorney, Agent, or Firm*—Oblon, Spivak, McClelland, Maier & Neustadt, P.C.

(57) ABSTRACT

The invention refers to a suspension pylon (4) for an aircraft engine (2), the pylon including a rigid structure (10) forming a box provided with a lower spar (28) and an upper spar (26), and an engine mounting system (11) installed fixed on the structure (10) and in particular including a forward attachment (6) with an attachment body provided with a horizontal fixing surface (40) held in contact with a horizontal fixing surface (38) of the structure (10). According to the invention, the attachment body is arranged such that its horizontal fixing surface (40) is located along a vertical direction (Z) of the pylon, upwards from a forward end (28a) of the lower spar and downwards from a forward end (26a) of the upper spar. Furthermore, the structure (10) includes at least one forward fitting (42a, 42b) making up a forward closing rib (36) of the box, this fitting (42a, 42b) defining said horizontal fixing surface (38).

6 Claims, 3 Drawing Sheets

ENGINE SUSPENSION PYLON FOR AIRCRAFT

TECHNICAL DOMAIN

This invention relates in general to an engine assembly for an aircraft of the type including an engine, a suspension pylon, and an engine mounting system provided with a plurality of engine fasteners and being inserted between a rigid structure of the suspension pylon and the engine.

The invention also relates to such a suspension pylon for the aircraft engine.

The invention may be used on any aircraft type, for example fitted with turbojets or turboprops.

This type of suspension pylon is also called an EMS (Engine Mounting Structure), for example that can be used to suspend a turboengine below the aircraft wing, or to fit this turboengine above this same wing.

STATE OF PRIOR ART

Such a suspension pylon is designed to form a connecting interface between an engine such as a turbojet and a wing of the aircraft. It transmits forces generated by its associated turbojet to the structure of this aircraft, and is also used for routing fuel, electrical, hydraulic and air systems between the engine and the aircraft.

In order to transmit forces, the pylon includes a rigid structure, frequently of the "box" type, in other words formed by the assembly of the upper spars and the lower spars and two side panels connected to each other through transverse ribs.

The pylon is also provided with an engine mounting system inserted between the turbojet and the rigid structure of the pylon, this system globally including at least two engine attachments, usually a forward attachment and an aft attachment.

Furthermore, the mounting system includes a device for resisting thrusts generated by the turbojet. For example in prior art, this device may be in the form of two lateral connecting rods connected firstly to an aft part of the turbojet fan case, and secondly to the engine aft attachment fixed to the engine case.

Similarly, the suspension pylon also includes a second mounting system inserted between the rigid structure of this pylon and the aircraft wing, this second system typically being composed of two or three attachments.

Finally, the pylon is provided with a secondary structure for segregation and for holding systems in place, while supporting aerodynamic fairings.

In some embodiments of prior art, the engine mounting system includes a forward attachment called the fan attachment due to the fact that it will be mounted fixed onto the engine fan case, that includes an attachment body with a horizontal fixing surface held in contact with a horizontal fixing surface of the rigid structure. Therefore the horizontal fixing interface formed by these two surfaces extends in a plane defined by the longitudinal and transverse directions of the suspension pylon, and is usually located at an external surface of the lower spar of the box in the case in which the engine will be suspended under the aircraft wing. The attachment body of the engine forward attachment is usually fixed on the lower spar of the box, underneath it.

This arrangement has a non-negligible disadvantage which is that the entire attachment body projects downward from the box, which results in a large vertical dimension of the pylon above the engine and therefore major aerodynamic disturbances adjacent to the engine forward attachment, this drag obviously resulting in losses in the aircraft performances. In this respect, note that these losses are relatively large due to the large dimensions of the attachment body imposed by the need to transmit forces from the engine towards the rigid structure of the suspension pylon.

OBJECT OF THE INVENTION

Therefore the purpose of the invention is to propose an aircraft engine suspension pylon to overcome the disadvantage mentioned above related to embodiments according to prior art, and also to present an engine assembly with such a pylon.

To achieve this, the object of the invention is a suspension pylon for an aircraft engine including a rigid structure forming a box provided with a lower spar and an upper spar, and an engine mounting system installed fixed on the rigid structure and in particular including an engine forward attachment with an attachment body provided with a horizontal fixing surface held in contact with a horizontal fixing surface of the rigid structure. According to the invention, the attachment body of the engine forward attachment is arranged such that its horizontal fixing surface is located along a vertical direction of the pylon, upwards from a forward end of the lower spar and downwards from a forward end of the upper spar of the rigid structure. Furthermore, the rigid structure includes at least one forward fitting making up a forward closing rib of the box, this forward fitting defining the horizontal fixing surface of the rigid structure.

Advantageously, the definition of the invention indicated above shows that the rigid structure has been modified from the structures typically encountered previously, such that the horizontal fixing surface of the attachment body of the forward attachment is located between the forward parts of the lower and upper spars of this rigid box shaped structure. If the pylon is designed to suspend the engine under the aircraft wing, the proposed arrangement also generally raises the horizontal fixing surface with respect to the lower spar, while in prior art, this same body only extended downwards from this same lower spar.

Consequently, such a configuration clearly reduces the dimension below the lower spar of the box, and therefore reduces aerodynamic disturbances adjacent to the engine forward attachment. Therefore for an attachment body with the same dimensions, the generated drag is advantageously lower than the drag that occurs in prior art.

Secondly, once again in the preferred case in which the pylon will be used to suspend the engine under the aircraft wing, the fact that the horizontal fixing surface of the attachment body of the forward attachment also raises the entire engine forward attachment, and consequently increases the ground clearance under the associated engine.

Furthermore, as indicated above, the rigid structure includes at least one forward fitting forming a forward closing rib of the box, this forward fitting defining the horizontal fixing surface of the rigid structure. Thus, it is preferably for the rigid structure to comprise a central forward fitting and two lateral forward fittings arranged on each side of the central forward fitting, this set of fittings forming the forward closing rib of the box and jointly defining the horizontal fixing surface of the rigid structure. Nevertheless, note that these fittings could be placed in bearing and could be fixed on a forward closing rib of the box, without going outside the framework of the invention. In such a case, it would be possible for the attachment body to be not in contact with the closing rib, but offset forward from it.

Preferably, the engine forward attachment is designed to resist forces applied along a transverse direction of the pylon and along the vertical direction of the pylon.

Furthermore, the engine mounting system, that is preferably a statically determinate system, also includes a device for resistance of thrusts and an engine aft attachment designed so as to resist forces applied along the transverse and vertical directions of the pylon.

Another purpose of the invention is an engine assembly for an aircraft including a pylon like that described above, and an engine fixed onto this pylon.

Other advantages and characteristics of the invention will become clearer from the detailed non-limitative description given below.

BRIEF DESCRIPTION OF THE DRAWINGS

This description will be made with reference to the appended drawings wherein.

DETAILED DESCRIPTION OF PREFERRED EMBODIMENTS

Figure 1:
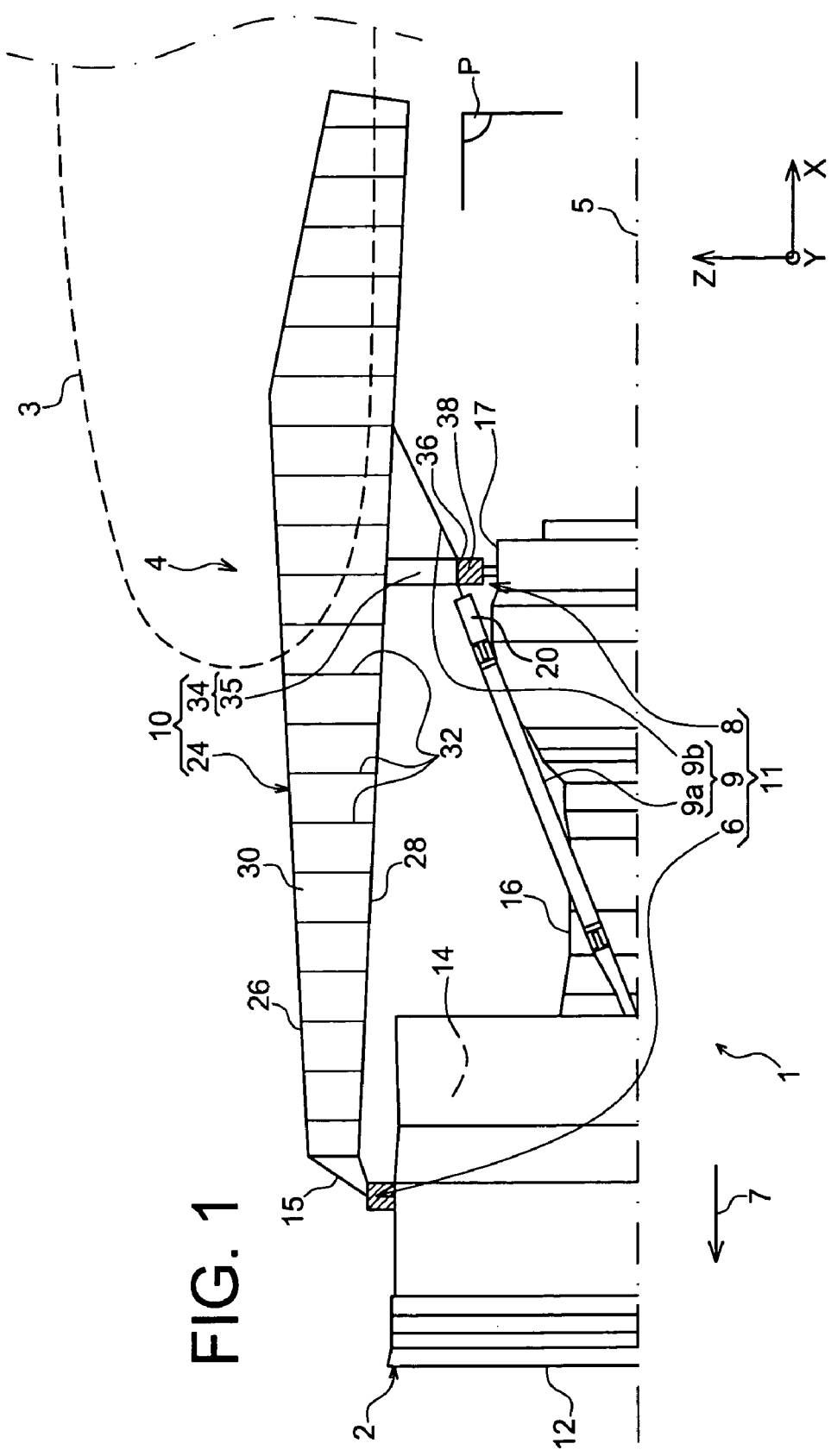
FIG. 1 shows a partial schematic side view of an engine assembly for an aircraft including a suspension pylon according to one preferred embodiment of this invention.

With reference to FIG. 1, the figure shows an engine assembly 1 for an aircraft designed to be fixed under a wing 3 of this aircraft, this assembly 1 according to this invention being provided with a suspension pylon 4 in the form of a preferred embodiment of this invention.

Globally, the engine assembly 1 includes an engine such as a turbojet 2 and the suspension pylon 4, the suspension pylon having in particular a rigid structure 10 and an engine mounting system 11 composed of a plurality of engine attachments 6, 8 and a device 9 for resistance of thrusts generated by the turbojet 2, the mounting system 11 therefore being inserted between the engine and the rigid structure 10 mentioned above. For information, note that the assembly 1 is designed to be surrounded by a pod (not shown in this figure), and that the suspension pylon 4 includes another series of attachments (not shown) for suspension of this assembly 1 under the aircraft wing.

Throughout the following description, by convention the X direction is the longitudinal direction of the pylon 4 that is coincident with the longitudinal direction of the turbojet 2, this direction X being parallel to a longitudinal axis 5 of this turbojet 2. Furthermore, the direction transverse to the pylon 4 is called Y and can be considered to be the same as the transverse direction of the turbojet 2, and Z is the vertical direction or the height, these three X, Y and Z directions being orthogonal to each other.

Furthermore, the terms <<forward>> and <<aft>> should be considered with respect to a direction of movement of the aircraft that occurs as a result of the thrust applied by the turbojet 2, this direction being shown diagrammatically by the arrow 7.

In FIG. 1, it can be seen that only the thrust resistance device 9, the engine attachments 6, 8 and the rigid structure 10 of the suspension pylon 4 are shown. The other components of this pylon 4 that are not shown, such as the means of fastening the rigid structure 10 under the aircraft wing, or the secondary structure for segregation of systems and holding them in place while also supporting aerodynamic fairing, are conventional elements identical to or similar to those encountered in prior art and known to those skilled in the art. Consequently, no detailed description of them will be given.

The turbojet 2 is provided with a large dimension fan case 12 at the forward end delimiting an annular fan duct 14 and includes a smaller central case 16 towards the aft end, containing the core of this turbojet. Finally, the central case 16 is extended backwards by an exhaust case 17 larger than the case 16. Obviously, the cases 12, 16 and 17 are all fixed to each other.

As can be seen in FIG. 1, the plurality of engine attachments consists of an engine forward attachment 6 and an engine aft attachment 8, the forward attachment 6 having a conventional design and being known according to prior art, namely for example of the type with an attachment body in the form of a fitting or a beam with a hinged shackle/connection rod at each of its lateral ends. The thrust resistance device 9 may for example be in the form of two lateral connecting rods (only one being visible due to the side view) connected firstly to an aft part of the fan case 12, and secondly to a cross beam itself mounted on the aft attachment 8.

The engine forward attachment 6, for which the positioning specific to this invention will be described later, is fixed to the fan case 12 and is designed so as to resist forces generated by the turbojet 2 along the Y and Z directions, by means of the two shackles/connecting rods. For information, this forward attachment 6 preferably penetrates into a circumferential end portion of the fan case 12.

The engine aft attachment 8 is globally inserted between the exhaust case 17 and the rigid structure 10 of the pylon. It is conventionally designed so as to be able to resist forces generated by the turbojet 2 along the Y and Z directions, but not forces applied along the X direction.

Figure 2:
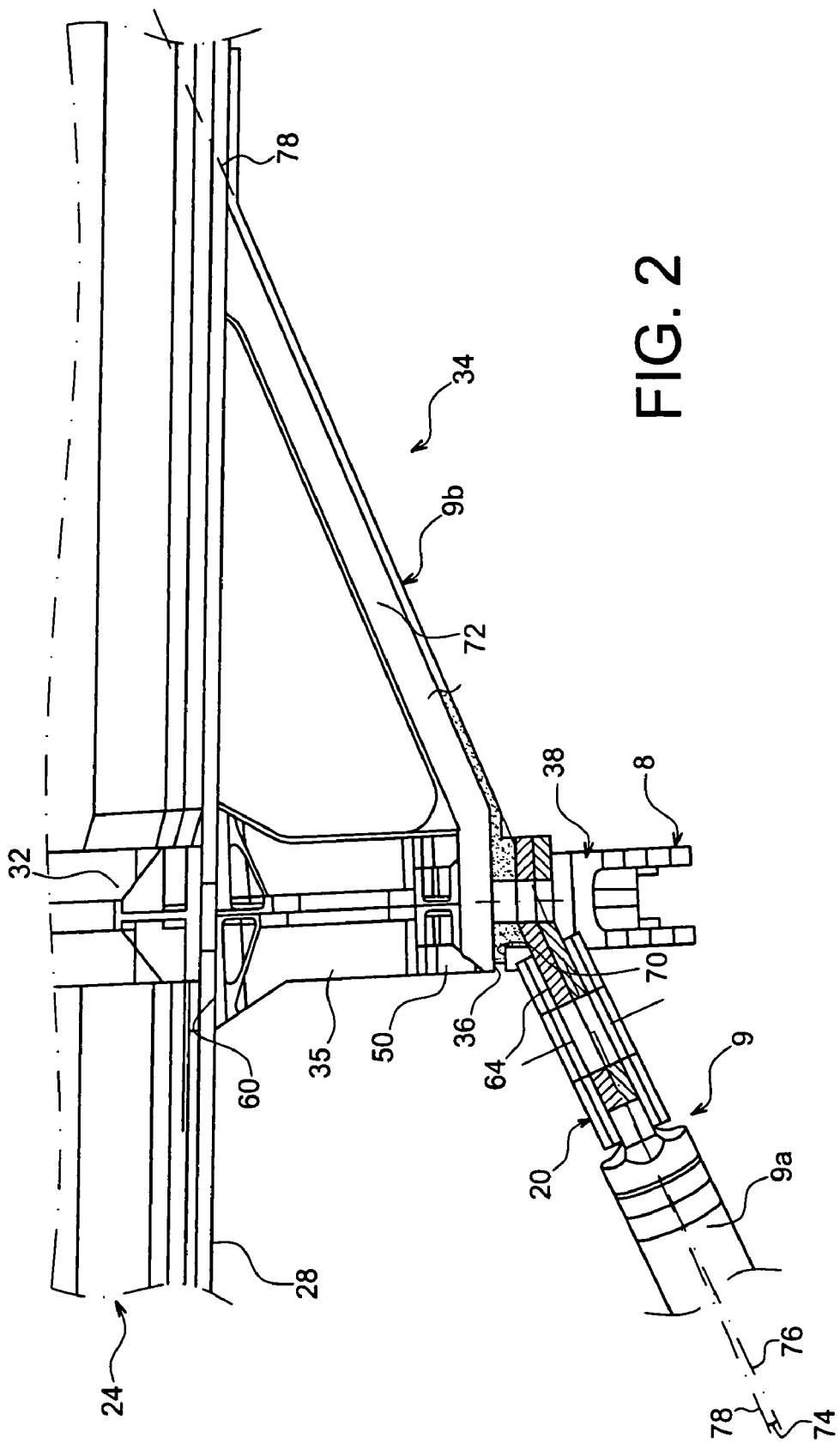
FIG. 2 shows a perspective view diagrammatically showing how forces are resisted by the engine mounting system used on the suspension pylon shown in FIG. 1.

In this way, with the statically determinate mounting system 11, as shown diagrammatically in FIG. 2, forces applied along the X direction are resisted by means of the device 9, forces applied along the Y direction are resisted by means of the forward attachment 6 and the aft attachment 8, and forces applied along the Z direction are also jointly resisted by means of the attachments 6 and 8. Furthermore, the moment applied about the X direction is resisted vertically by means of the forward attachment 6, the moment applied about the Y direction is resisted vertically by means of the forward attachment 6 jointly with the attachment 8, and the moment applied along the Z direction is resisted transversely also by means of the attachment 6 and the attachment 8.

Once again with reference to FIG. 1, it can be seen that the structure 10 is in the form of a box extending in the X direction, this box also being called the torsion box. It is conventionally formed by an upper spar 26 and a lower spar 28, and by two lateral panels 30 (only one being visible in FIG. 1), both extending along the X direction and substantially in an XZ plane. Transverse ribs 32 inside this box arranged in the YZ planes and at a longitudinal spacing reinforce the stiffness of the box. Note for guidance that the elements 26, 28 and 30 can each be made in a single piece, or by the assembly of adjacent sections, that may possibly be inclined slightly with respect to each other.

Once again with reference to FIG. 1, which shows a case in which the engine 2 will be suspended under the wing 3, the structure 10 is equipped with one or several forward fittings preferably designed to jointly form a forward closing rib 36 of the box, these fittings defining a horizontal fixing surface 38 in their lower part that will contain the attachment body of the engine forward attachment 6. More precisely, the surface 38 will be mounted fixed and bearing in contact with a horizontal fixing surface 40 of the attachment body of the engine forward attachment 6, therefore the two surfaces 38, 40 being arranged substantially in an XY plane.

One of the particular features of this invention is the fact that the engine forward attachment 6 is arranged such that its horizontal fixing surface 40 is located along the vertical direction of the pylon upwards from a forward end 28a of the lower spar 28, and downwards from a forward end 26b of the upper spar 26. Obviously, this definition of the location of the horizontal fixing surface 40 is also applicable for the horizontal fixing surface 38 of the rigid structure in contact with this surface 40. For guidance, note that the surfaces 38 and 40 may be fully located forward from the ends 26a and 28a of the spars 26, 28, or partially located between these ends 26a, 28a without going outside the framework of the invention.

Thus, this particular arrangement of the fixing surfaces 38, 40 can be used to obtain a partial overlap between the forward closing rib 36 and the attachment body of the forward attachment 6, along the X direction, which means that the engine forward attachment assembly can be globally raised, and therefore aerodynamic disturbances adjacent to this attachment 6 can be reduced.

Figure 3:
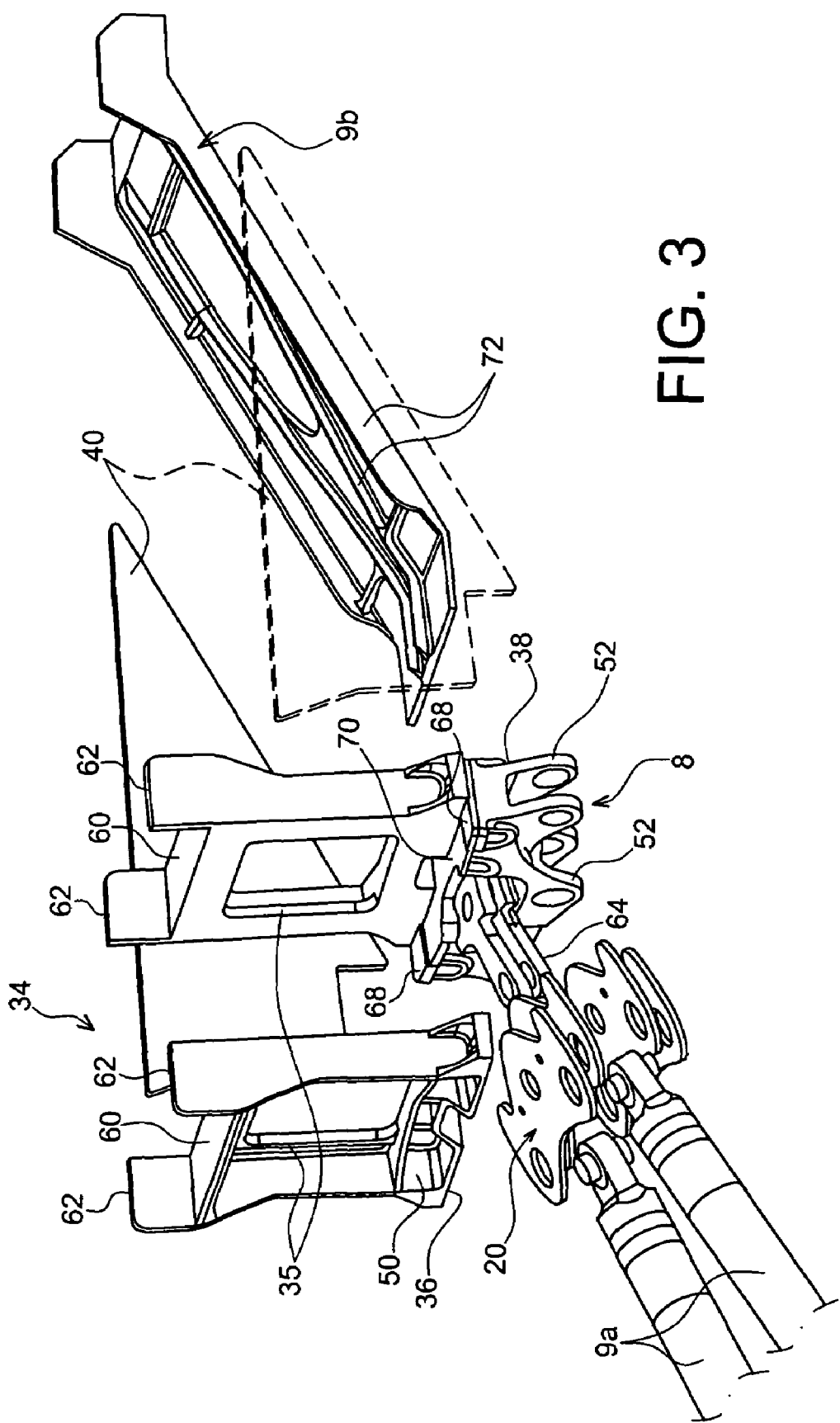
FIG. 3 shows a detailed perspective view of the forward part of the pylon shown in FIG. 1.

Now with reference to FIG. 3 showing the forward part of the pylon 4 in more detail, it can be seen that the rigid structure 10 preferably includes a central forward fitting 42a and two lateral forward fittings 42b arranged on each side of the fitting 42a, these three fittings therefore forming the forward closing rib 36 of the box, mainly using their vertical upper portion oriented approximately in a YZ plane. Furthermore, with their horizontal lower portion fixed to their vertical upper portion, they jointly define the horizontal fixing surface 38 of the rigid structure 10. As can be clearly seen in FIG. 3, the upper and lower portions of the forward fittings 42a, 42b are connected to each other by means of stiffening ribs 44 substantially oriented along the XZ planes. Furthermore, note that these fittings extend together over a width along the Y direction substantially identical to the width of the box. On the other hand, their height along the Z direction is naturally less than the height of this closing rib 36, such that the horizontal fixing surface 38 defined by the fittings 42a, 42b together with a forward lower part of the box form a setback (not referenced) that will house an attachment body of the attachment 6.

Therefore, the engine forward attachment 6 includes an attachment body 46 in the form of a fitting or a beam in the transverse direction and fixed onto the rigid structure 10, and therefore more precisely on each of the forward fittings 42a, 42b, for example through vertical bolts (not shown).

Furthermore, a vertical shear pin 48 that passes through the central part of the body 46 defining the fixing surface 40, and the central forward fitting 42a that resists forces along the Y direction.

The engine forward attachment 6 at the two lateral end of the attachment body 46 has two clevises, and two shackles/connecting rods 50 are hinged to these clevises, each of the shackles/connecting rods partially forming a half-attachment of the forward attachment that transmits forces applied along the Z direction. These shackles 50 are also articulated at their other end onto devises that also form part of the forward attachment 6 and are fixed onto the engine case 2, in a manner known to an expert in the subject.

Obviously, those skilled in the art can make various modifications to the engine assembly 1 for an aircraft that have just been described, solely as a non-limitative example. Note in particular that although the engine assembly 1 has been presented in a configuration suitable for suspension under the aircraft wing, this assembly 1 could also be in an alternative configuration by which it could be mounted above this wing.

The invention claimed is:

1. Suspension pylon (4) for an aircraft engine (5), said pylon including a rigid structure (10) forming a box provided with a lower spar (28) and an upper spar (26), and an engine mounting system (11) mounted fixed on said rigid structure (10) and in particular including an engine forward attachment (6) with an attachment body (46) provided with a horizontal fixing surface (40) held in contact with a horizontal fixing surface (38) of said rigid structure (10), characterised in that said attachment body (46) of the engine forward attachment (6) is arranged such that its horizontal fixing surface (40) is located along a vertical direction (Z) of the pylon, upwards from a forward end (28a) of the lower spar (28) and downwards from a forward end (26a) of the upper spar (26) of the rigid structure (10), and in that said rigid structure (10) includes at least one forward fitting (42a, 42b) making up a forward closing rib (36) of the box, this forward fitting (42a, 42b) defining said horizontal fixing surface (38) of the rigid structure (10).

2. Suspension pylon (4) according to claim 1, characterised in that said rigid structure (10) includes a central forward fitting (42a) and two lateral forward fittings (42b) arranged on each side of said central forward fitting, said fittings (42a, 42b) forming the forward closing rib (36) of the box, and jointly defining said horizontal fixing surface (38) of the rigid structure (10).

3. Suspension pylon (4) according to either of the previous claims, characterised in that said engine forward attachment (6) is designed to resist forces applied along a transverse direction (Y) of the pylon, and along the vertical direction (Z) of this pylon.

4. Suspension pylon (4) according to claim 1, characterised in that said engine mounting system (11) also includes a device (9) for thrust resistance, and an engine aft attachment (8) designed so as to resist forces applied along the transverse (Y) and vertical (Z) directions of the pylon.

5. Suspension pylon (4) according to claim 1, characterised in that said engine mounting system (11) is a statically determinate system.

6. Engine assembly (1) for aircraft characterised in that it includes a suspension pylon (4) according to claim 1, and an engine (2) installed fixed on said pylon.

* * * * *